(12) United States Patent
McKenna et al.

(10) Patent No.: US 12,530,384 B1
(45) Date of Patent: Jan. 20, 2026

(54) RESPONSE GENERATION FOR QUERY SETS USING GENERATIVE MODELS

(71) Applicant: Citibank, N.A., New York, NY (US)

(72) Inventors: Tod McKenna, Boston, MA (US); Yuval Mor, Tel Aviv (IL); Ido David, Tel Aviv (IL)

(73) Assignee: Citibank, N.A.

( * ) Notice: Subject to any disclaimer, the term of this patent is extended or adjusted under 35 U.S.C. 154(b) by 0 days.

(21) Appl. No.: 19/193,506

(22) Filed: Apr. 29, 2025

Related U.S. Application Data

(60) Provisional application No. 63/765,513, filed on Feb. 28, 2025.

(51) Int. Cl.
*G06F 16/3329* (2025.01)
*G06F 16/334* (2025.01)

(52) U.S. Cl.
CPC ...... *G06F 16/33295* (2025.01); *G06F 16/334* (2019.01)

(58) Field of Classification Search
CPC ................................................ G06F 16/33295
See application file for complete search history.

(56) References Cited

U.S. PATENT DOCUMENTS 12,282,572 B1 * 4/2025 Manton .............. G06F 21/6227
2022/0108167 A1 * 4/2022 Upadhyay .............. G06F 3/061

* cited by examiner

*Primary Examiner* — Van H Oberly
(74) *Attorney, Agent, or Firm* — Perkins Coie LLP

(57) ABSTRACT

Systems, methods, and devices that relate to generation of responses to query sets are disclosed. In one example aspect, the system uses multiple models to retrieve data relevant to queries and appropriate for the requesting user and to output the data in a certain style. In particular, the system uses a first model to determine a type of user submitting a query, a second model to retrieve data relevant to the query, subject to constraints based on the type of user, and a third model to formulate a response to the query, based on the retrieved data, using a consistent style. In some implementations, another model enables certain users to validate the outputs from one or more of the first, second, and third models. The system can output a compilation of the responses to the queries in a particular manner, style, or presentation that is consistent across all outputs.

14 Claims, 10 Drawing Sheets

RESPONSE GENERATION FOR QUERY SETS USING GENERATIVE MODELS

CROSS-REFERENCE TO RELATED APPLICATIONS

This application claims the benefit of U.S. Provisional Application No. 63/765,513, filed Feb. 28, 2025, entitled "RESPONSE GENERATION FOR QUERY SETS USING GENERATIVE MODELS," the content of which is incorporated herein by reference in its entirety.

SUMMARY

As large institutions continue to grow, one of the biggest challenges they face is responding to the vast number of questions they receive. These questions can come in various forms, including structured formats, such as questionnaires and proposals, as well as unstructured formats, such as chat messages and phone calls. The sheer volume and diversity of these inquiries can pose significant difficulties in managing and responding to them efficiently, consistently, and accurately. Moreover, the costs associated with managing and responding to these inquiries can be extremely draining on resources.

As an illustrative example, Due Diligence Questionnaires (DDQs) are documents through which users can inquire about various aspects of an institution's operations, compliance, and other critical information. These questionnaires require detailed and accurate responses, based on data retrieved from databases, unstructured content sources, and other sources, which can be time-consuming to prepare. Conventional systems rely on dedicated teams to triage these questionnaires, meticulously reviewing and responding to each question within the extensive documents. This process can take dozens of hours per document, leading to delays and inefficiencies and introducing room for error.

However, institutions can leverage historical data, gained from answering many similar questions in the past, to improve the accuracy and efficiency of the response process. This patent document discloses a method of using multiple models, some of which are trained on the historical data, to retrieve data relevant to queries and appropriate for the requesting user and to output the data in a style that is consistent across the institution. In particular, the present disclosure will be directed to using a first model to determine a type of user submitting a query, using a second model to retrieve data relevant to the query, subject to constraints based on the type of user, and using a third model to formulate a response to the query, based on the retrieved data, using a consistent style.

For example, a system can receive, from a user who has performed a login, an input document including a number of queries. The login can be used to obtain user information about the user who submitted the document to the institution. The system can input, into a first artificial intelligence (AI) system (e.g., including a small language model (SLM), a large language model (LLM), or another type of machine learning model), the user information based on the login to obtain a determination that the user is a first type of user. In some implementations, the first type of user is associated with certain permissions, data sources, data types, jurisdictions, product lines, tags, or other information. This user type can be used to tailor data results to the user.

For each query within the document, the system can search for relevant data that answers the query. In some implementations, the system can first search through a cache of curated stored data previously retrieved from one or more databases. For example, the system can search through responses to frequently asked questions in order to locate any response previously retrieved from one or more databases. In some implementations, the search is performed subject to constraints associated with the first type of user, the query, and metadata of the query, such that only a subset of responses or other stored data is searched. This can be a cost-saving measure to efficiently locate previously-retrieved data.

In some implementations, the system uses a second AI system to search for data relevant to each query within the databases. In some implementations, the system uses the second AI system when the search of the cache fails to yield relevant results. In some implementations, the second AI system is the same as the first AI system and is prompted to perform different operations. In some implementations, the second AI system is separate from the first AI system. The system can input, into the second AI system, a prompt. In some embodiments, the prompt a prompt may be directed to the query or aspects of the query. In some embodiments, the system may input, into the second AI system, both the query and a prompt directed to the query or aspects of the query. The input may cause the second AI system to retrieve and output data that is relevant to the query and that is customized for the first type of user, the query, and metadata of the query. For example, the second AI system can include a retrieval-augmented generation (RAG) framework that can retrieve data from the databases, subject to constraints based on types of users and the query. In some implementations, the retrieval involves assessing semantic similarity between the query and stored vectors in a vector database. The RAG can retrieve data based on the highest degree of similarity. In some implementations, the RAG utilizes natural language processing (NLP) search methods for the retrieval process. In some implementations, the output from the second AI system is transmitted to an internal group of users, who perform validation checks and approve the output from the second AI system. In some implementations, this validation process can involve another model or AI system.

The system can then conform the response to each query to a particular style, e.g., a persona, that is consistent across all responses generated by the institution. For example, the system can input, into a third AI system, the data that is relevant to the query and that is customized for the first type of user. The third AI system can be trained on historical data to conform responses to the particular style used consistently across responses generated by the institution. This type of training can cause the third AI system to output a response to the query that conforms to the particular style. In some implementations, any of the first, second, third, or other AI systems can replace any of the other of the first, second, third, or other AI systems. In some implementations, any of the first, second, third, or other AI systems can be the same as any of the other of the first, second, third, or other AI systems.

Once the system determines responses to all queries within the document, the system can compile the responses to the queries into a new template document to be transmitted to the user. In some implementations, the document is reviewed before transmission to ensure accuracy, completeness, conformity to the particular style, or other checks. Once the document is approved for transmission, the system can output the document to the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to source code programming.

The disclosed technology provides a system and method for providing customized responses to query sets. In particular, systems and methods described herein involve using multiple models, some of which are trained on the historical data, to retrieve data relevant to queries and appropriate for the requesting user and to output the data in a style that is consistent across the institution. In particular, the present disclosure will be directed to using a first model to determine a type of user submitting a query, using a second model to retrieve data relevant to the query, subject to constraints based on the type of user, and using a third model to formulate a response to the query, based on the retrieved data, using a consistent style.

Figure 1:
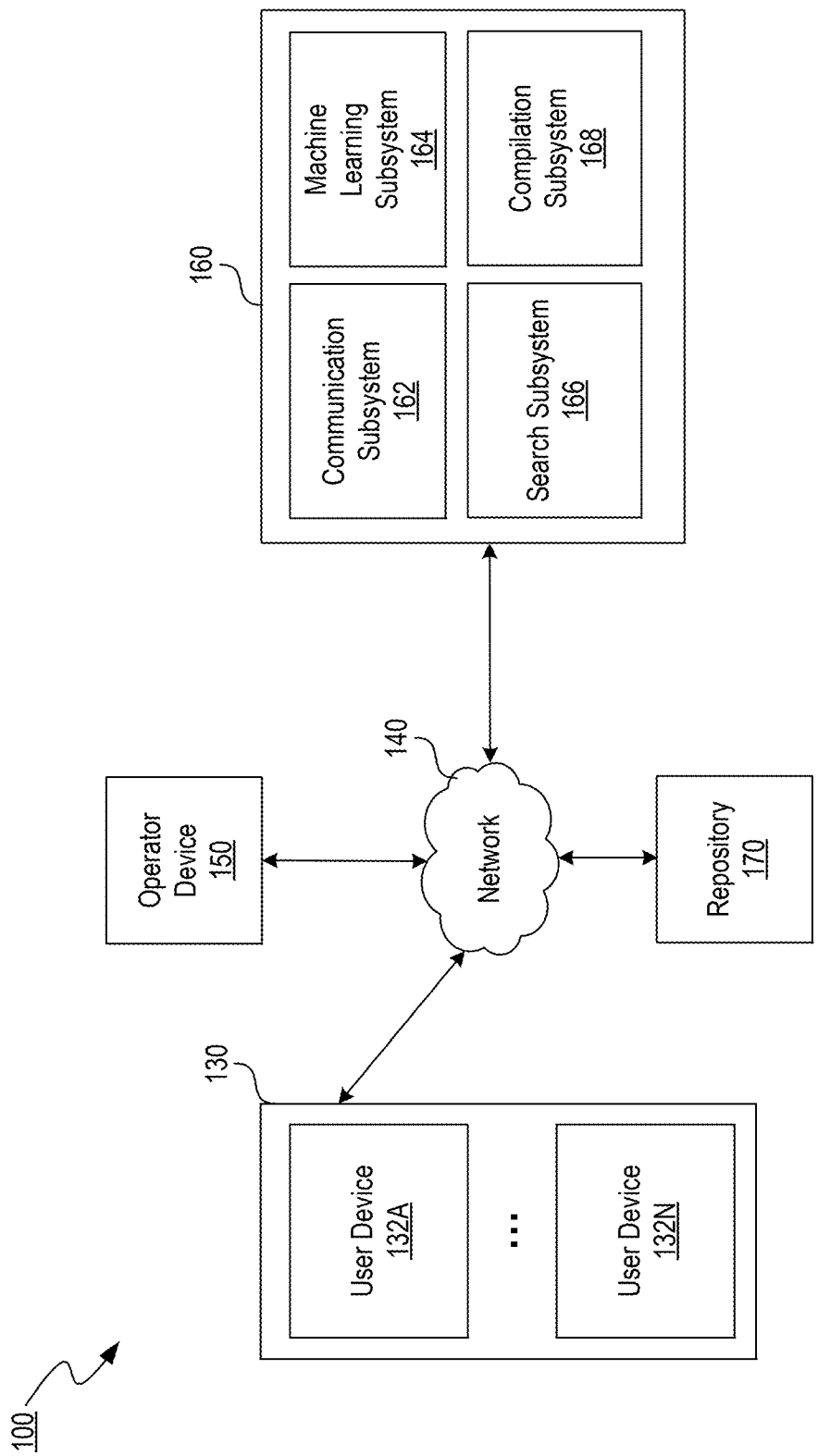
FIG. 1 shows an illustrative system for providing customized responses to query sets, in accordance with one or more implementations of this disclosure.

FIG. 1 shows an illustrative system 100 for providing customized responses to query sets, in accordance with one or more implementations of this disclosure. For example, the system 100 can be used to retrieve data relevant to queries and appropriate for the requesting user and to output the data in a style that is consistent. In some implementations, the system 100 can use a first model to determine a type of user submitting a query, use a second model to retrieve data relevant to the query, subject to constraints based on the type of user, and use a third model to formulate a response to the query, based on the retrieved data, using a consistent style. In some implementations, other models can be used for validation of outputs from any of these models.

For example, the system 100 can include a query response system 160 able to provide customized responses to query sets in a style that is consistent. The query response system 160 can include software, hardware, or a combination of the two. For example, the query response system 160 can be a physical server or a virtual server that is running on a physical computer system. In some implementations, the query response system 160 can be configured on a user device (e.g., a laptop computer, a smartphone, a desktop computer, an electronic tablet, or another suitable user device) and configured to execute instructions for responding to queries. In particular, the query response system 160 can include several subsystems each configured to perform one or more steps of the methods described herein, such as a communication subsystem 162, a machine learning subsystem 164, a search subsystem 166, and a compilation subsystem 168.

As described herein, the query response system 160 can receive requests, documents, queries, sets of queries, or other inputs. The query response system 160 can receive the data from user devices 130 (e.g., user device 132A, user device 132N). In some implementations, the query response system 160 can receive data via a user interface with functionality for receiving uploads and other inputs. The query response system 160 can be configured to receive the data via a communication network 140 at the communication subsystem 162. The communication network 140 can be a local area network (LAN), a wide area network (WAN; e.g., the internet), or a combination of the two. The communication subsystem 162 can include software components, hardware components, or a combination of both. For example, the communication subsystem 162 can include a network card (e.g., a wireless network card or a wired network card) that is associated with software to drive the card. The communication subsystem 162 can pass at least a portion of the data, or a pointer to the data in memory, to other subsystems such as the machine learning subsystem 164, the search subsystem 166, and the compilation subsystem 168.

Additionally, the system 100 can include a repository 170, which can store historical data, training data, machine learning model parameters, and system commands. In some implementations, the repository 170 can store a cache of frequent queries and corresponding responses, which can be used by the query response system 160 as a cost-effective method of responding to frequent queries. The repository 170 can also include metadata or tags associated with stored data. The query response system 160 can retrieve data from the repository 170 to refine predictions, respond to queries, and store updates. Additionally, the repository 170 can store augmented datasets used to update the machine learning model based on newly collected or updated data, ensuring adaptive and evolving predictions.

The system 100 can further include an operator device 150, which can receive alerts generated by the query response system 160, for example, when the query response system 160 identifies conflicting information. The operator device 150 can be a desktop computer, mobile device, or other suitable user interface through which an operator can review system notifications. The query response system 160 can transmit natural language explanations generated by an explainability model to the operator device 150 to provide insights into conflicting data.

Figure 2:
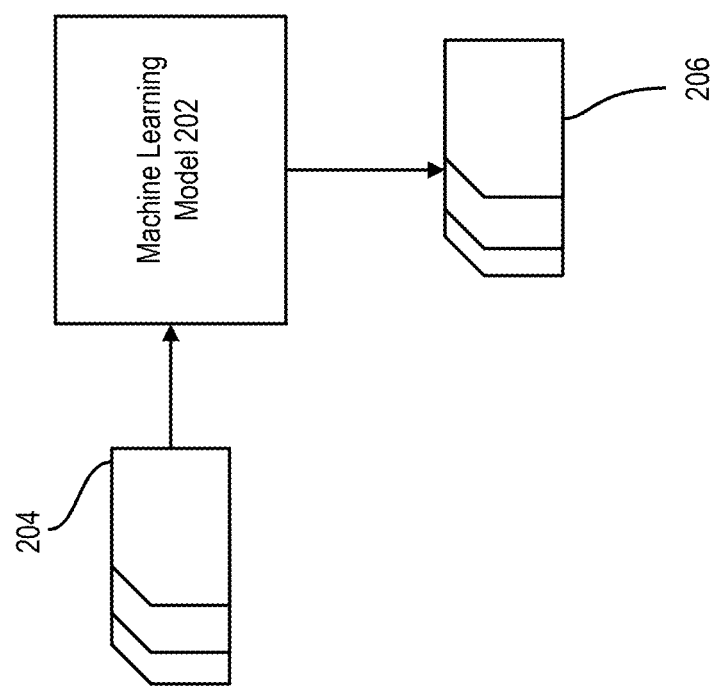
FIG. 2 illustrates an exemplary machine learning model trained to provide customized responses to query sets, in accordance with one or more implementations of this disclosure.

In some implementations, machine learning subsystem 164 can include one or more machine learning models. FIG. 2 illustrates an exemplary machine learning model 202 trained to provide customized responses to query sets, in accordance with one or more implementations of this disclosure. The machine learning model 202 can include an LLM, an SLM, another type of generative model, or another type of machine learning model. According to some examples, the machine learning model can be any model, such as a model for classification. In some implementations, the machine learning model 202 can be trained to intake input 204, including input data received. As a result of inputting the input 204 into the machine learning model 202, the machine learning model 202 can then output an output 206. As described herein, the input data can include data such as user login information, requests, queries, documents, responses to queries, or other inputs.

In some implementations, the output 206 can include a response to each query within the document. Furthermore, as described, the machine learning model 202 can be configured to output a confidence interval or other metric for certainty regarding the other outputs. In some implementations, the machine learning model 202 can be trained on user information and a corresponding type of user. The machine learning model 202 can be trained on a training dataset including queries and corresponding responses. In some implementations, the machine learning model 202 can be trained on responses to queries and corresponding natural language outputs describing the responses. The output parameters can be fed back to the machine learning model 202 as input to train the machine learning model 202 (e.g., alone or in conjunction with user indications of the accuracy of outputs, labels associated with the inputs, or other reference feedback information). The machine learning model 202 can update its configurations (e.g., weights, biases, or other parameters) based on the assessment of its prediction and reference feedback information (e.g., user indication of accuracy, reference labels, or other information). Connection weights can be adjusted, for example, if the machine learning model 202 is a neural network, to reconcile differences between the neural network's prediction and the reference feedback regarding relevant data from various data sources. One or more neurons of the neural network can require that their respective errors are sent backward through the neural network to facilitate the update process (e.g., backpropagation of error). Updates to the connection weights may, for example, be reflective of the magnitude of error propagated backward after a forward pass has been completed.

In some implementations, the machine learning model 202 can include an artificial neural network. In such implementations, the machine learning model 202 can include an input layer and one or more hidden layers. Each neural unit of the machine learning model 202 can be connected to one or more other neural units of the machine learning model 202. Such connections can be enforcing or inhibitory in their effect on the activation state of connected neural units. Each individual neural unit can have a summation function that combines the values of all of its inputs together. Each connection (or the neural unit itself) can have a threshold function that a signal must surpass before it propagates to other neural units. The machine learning model 202 can be self-learning or trained rather than explicitly programmed and can perform significantly better in certain areas of problem-solving as compared to computer programs that do not use machine learning. During training, an output layer of the machine learning model 202 can correspond to a classification of the machine learning model 202, and an input known to correspond to that classification can be input into an input layer of the machine learning model 202 during training. During testing, an input without a known classification can be input into the input layer, and a determined classification can be output.

The machine learning model 202 can include embedding layers in which each feature of a vector is converted into a dense vector representation. These dense vector representations for each feature can be pooled at one or more subsequent layers to convert the set of embedding vectors into a single vector. The machine learning model 202 can be structured as a factorization machine model. The machine learning model 202 can be a non-linear model or supervised learning model that can perform classification or regression. For example, the machine learning model 202 can be a general-purpose supervised learning algorithm that the query response system 160 uses for both classification and regression tasks. Alternatively, the machine learning model 202 can include a Bayesian model configured to perform variational inference on the graph or vector.

Figure 3:
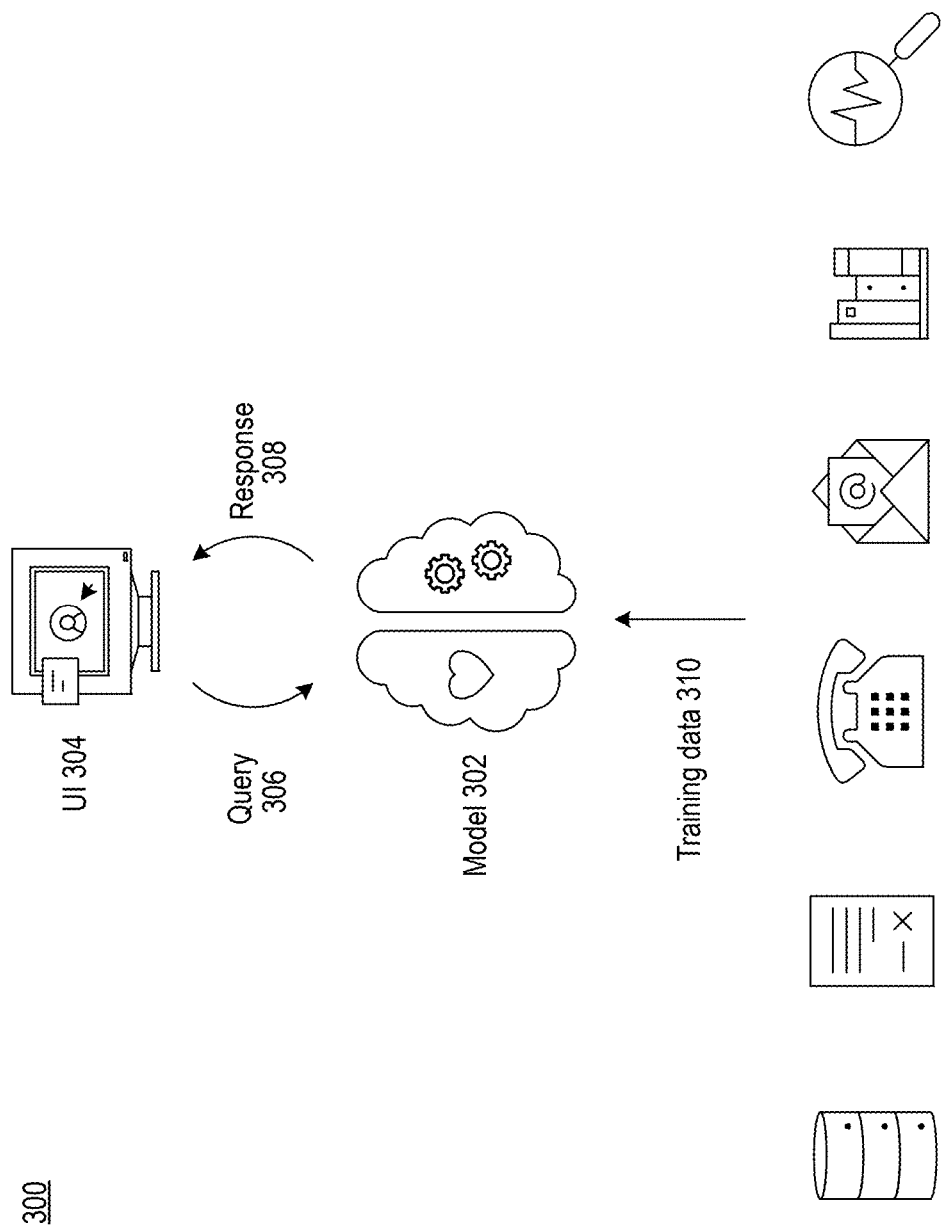
FIG. 3 illustrates training of a model to provide customized responses to query sets, in accordance with one or more implementations of this disclosure.

FIG. 3 illustrates training 300 of a model 302 to provide customized responses to query sets, in accordance with one or more implementations of this disclosure. The model 302 can be an AI system or any type of machine learning model. In some implementations, training 300 involves training data 310, which can include data stored in databases, in historical documents or query sets, in call transcripts, in email logs, online, or in other types of data sources. The training data 310 can be structured or unstructured. The databases can be "vector database" sourced from structured and unstructured content sources. For example, data stored in databases can be structured whereas data retrieved from a call transcript can be unstructured. In some implementations, some of the training data 310 is labeled data, including metadata that identifies an output label associated with the data. This labeled data can be used to train the model 302 to recognize patterns and make accurate predictions based on the input queries. The model 302 can additionally learn to recognize patterns and make accurate predictions based on unstructured and unlabeled data.

The quality and reliability of the training data are paramount. Before the data is used to train the model, it can undergo a rigorous preprocessing phase. This preprocessing phase can involve several steps, including data cleaning, normalization, and transformation. Data cleaning can involve the removal of any duplicate, irrelevant, or erroneous data points that could potentially skew the model's learning process. Normalization can ensure that the data is consistent and follows a standard format, which can be particularly important when dealing with data from multiple sources. Transformation can involve converting the data into a format that is more suitable for the model's algorithms, such as converting text data into numerical vectors.

In addition to preprocessing, the training data can be vetted for quality to ensure its accuracy and relevance. This vetting process can involve a thorough review of the data sources to verify their credibility and reliability. Data that comes from reputable and authoritative sources can be prioritized, while data from less reliable sources can be scrutinized more closely or even discarded. The vetting process can also involve the use of automated tools and algorithms to detect and flag any anomalies or inconsistencies in the data. By ensuring that the training data is of high quality, the likelihood of the model producing accurate and reliable predictions can be significantly increased.

The training process can involve the use of various machine learning algorithms and techniques, such as supervised learning, unsupervised learning, or reinforcement learning, to optimize the model's performance. The model 302 can also undergo iterative training cycles, where it is continuously refined and improved based on feedback and new data. This iterative process can help ensure that the model 302 remains up-to-date and capable of providing accurate and relevant responses to a wide range of query sets.

Once it has been trained, the model 302 can be deployed to assist with the process of providing customized responses to query sets. For example, the model 302 is deployed to provide a response 308 to a query 306 received via a UI 304. The model 302 can do so by retrieving relevant data from reputable sources, cross referencing the data with other data sources, and formulating a response that addresses the query with the relevant data. In some implementations, the model 302 is trained to perform other tasks relating to providing responses to queries. For example, the model 302 can be trained to determine user types or categories when users submit queries to the query response system. In some implementations, the model 302 can be trained to formulate natural language responses based on the relevant data retrieved by another model. In some implementations, the model is trained to perform other tasks or multiple tasks relating to providing responses to queries.

Finally, the training data 310 can be continuously monitored and updated to ensure that it remains relevant and up-to-date. As new data becomes available, it can be incorporated into the training dataset, and the model 302 can be retrained to reflect the latest information. This continuous updating process can help to ensure that the model 302 remains accurate and effective over time. Additionally, feedback from the model's performance can be used to identify any areas where the training data 310 can need to be improved or expanded. By maintaining a high standard of quality for the training data 310, the overall performance and reliability of the model 302 is bolstered.

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer") and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks and there can be more complex neural network designs that include feedback connections, skip connections, or other such possible connections between neurons or layers, which are not discussed in detail here.

A deep neural network (DNN) is a type of neural network having multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language), a subject domain (e.g., scientific papers), or can encompass another domain or domains, be they larger or smaller than a single language or subject domain. For example, a relatively large, multilingual, and non-subject-specific corpus can be created by extracting text from online webpages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model typically is to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during machine learning model training. For example, the training set can be first used to train one or more machine learning models, each machine learning model, e.g., having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for alerts to operators, or commands that have been trained generically on publicly available text corpora can be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It can be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture), unless stated otherwise. For example, unless stated otherwise, the "language model" encompasses LLMs.

A language model can use a neural network (typically a DNN) to perform NLP tasks. A language model can be trained to model how words relate to each other in a textual sequence, based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures such as RNN-based language models. Transformers are discussed in greater detail below, in relation to FIG. 9.

Figure 4:
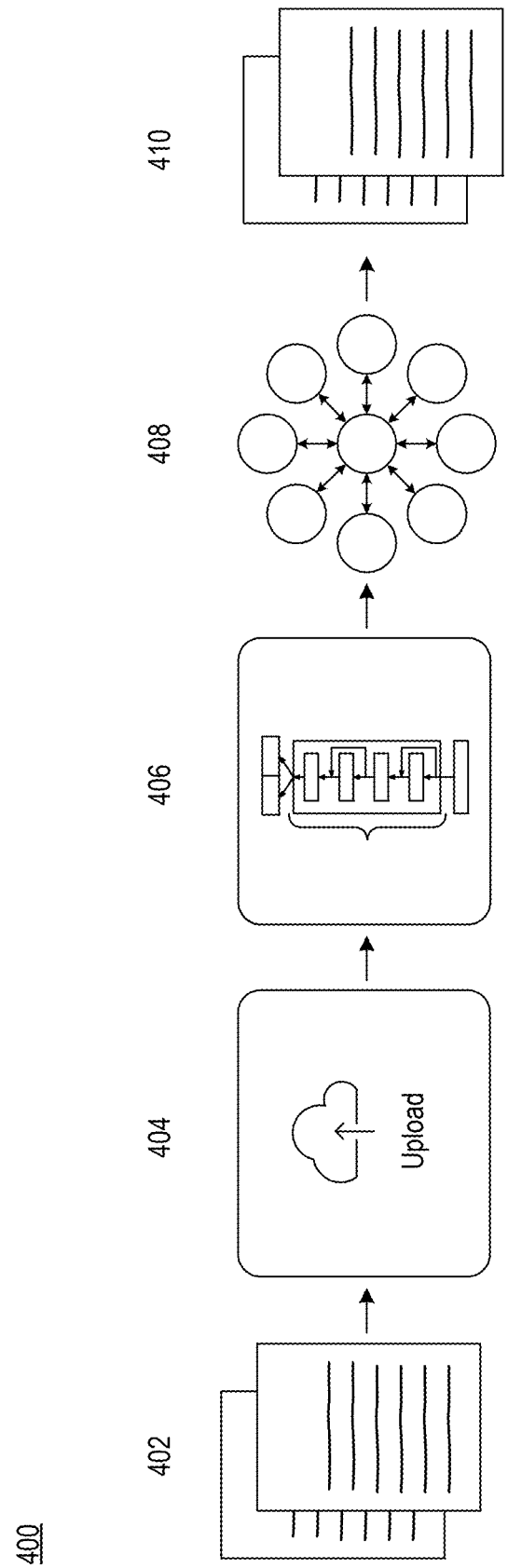
FIG. 4 illustrates a flow for providing customized responses to query sets, in accordance with one or more implementations of this disclosure.

FIG. 4 illustrates a flow 400 for providing customized responses to query sets, in accordance with one or more implementations of this disclosure. As shown in FIG. 4, flow 400 can begin with an input, such as a document 402. The document 402 can include a set of queries for which responses must be generated by the query response system. As an illustrative example, the document 402 is a DDQ, which includes a set of questions or instructions. In some implementations, the query response system receives the document 402 via a user interface. In some implementations, documents are reviewed upon receipt for quality, compatibility, or other checks. The flow 400 can include a query upload 404. For example, the queries can be extracted from the document 402 and uploaded for processing by the query response system 160. In some implementations, this process is performed by an operator after the document 402 has been received and reviewed. The flow 400 can include the query response system providing responses 406 to the queries extracted from the document 402. For example, the query response system can use any of the systems and methods described herein to generate a response to each query within the document 402.

The flow 400 can include a review 408. In some implementations, the responses 406 are sent to various reviewers, operators, supervisors, or other users for review. In some implementations, the review 408 includes providing feedback on the responses 406. Feedback can include approving, denying, fixing, updating, or flagging any of the responses 406. In some implementations, upon successful completion of the review 408, the flow 400 includes generation of an output 410. For example, the output 410 can be a DDQ template, in which the responses 406 are populated. In some implementations, the output 410 can be generated by the query response system using a template, format, or style that is specific to the query response system, platform, or recipient. In some implementations, other methods of generating the output 410 can be used. The output 410 can also be sent for review by reviewers, operators, supervisors, or other users. These users can review the output 410 for formatting, correctness, thoroughness, relevance, or other checks. Once the output 410 has been approved for output, the query response system can generate the output 410 for display or transmit the output 410 to a user. For example, the query response system can display or transmit the output 410 to the user from whom the document 402 was received.

In some implementations, the flow 400 can be implemented as a chat functionality. In some implementations, any of the methods discussed herein are incorporated into this chat implementation. For example, a chat implementation can use NLP and advanced data retrieval techniques to provide real-time, accurate responses to user inquiries. A chat implementation can include an NLP inquiry system, which enables users to interact with the platform using natural language. For example, the flow 400 can begin at the query upload 404, which enables a user to upload a query via the chat functionality. The query response system integrated with the chat functionality can be designed to understand and process complex queries in real time. Knowledge graphs can play a role in this process, providing a structured representation of information that the query response system can use to identify relationships and context. can vectorize the entire data ecosystem, encompassing all available sources. As an illustrative example, if a user wants to learn about a specific topic, the query response system can locate relevant data (e.g., responses 406), including articles, news stories, and proprietary sources.

The flow 400 can include the review 408. In some implementations, upon successful completion of the review 408, the flow 400 includes generation of an output 410. For example, the output 410 can be a natural language response to the query upload 404 including the relevant data that is available and accessible to the user. For example, the chat implementation includes robust authentication mechanisms to ensure that users have the appropriate permissions to access certain information. If a user without the necessary permissions submits a query, the query response system can enforce a paywall or authorization block, providing some information while indicating that more detailed data is available for an additional fee or for users with higher permission levels. Additionally, the system can include a user interface (UI) for analyst reviewers, equipped with dials to adjust parameters such as permissible hallucination levels, confidence scores, completeness and relevancy requirements, and other parameters or thresholds. This allows analysts to fine-tune the system's responses, ensuring that the information provided is both trustworthy and accurate.

Figure 5:
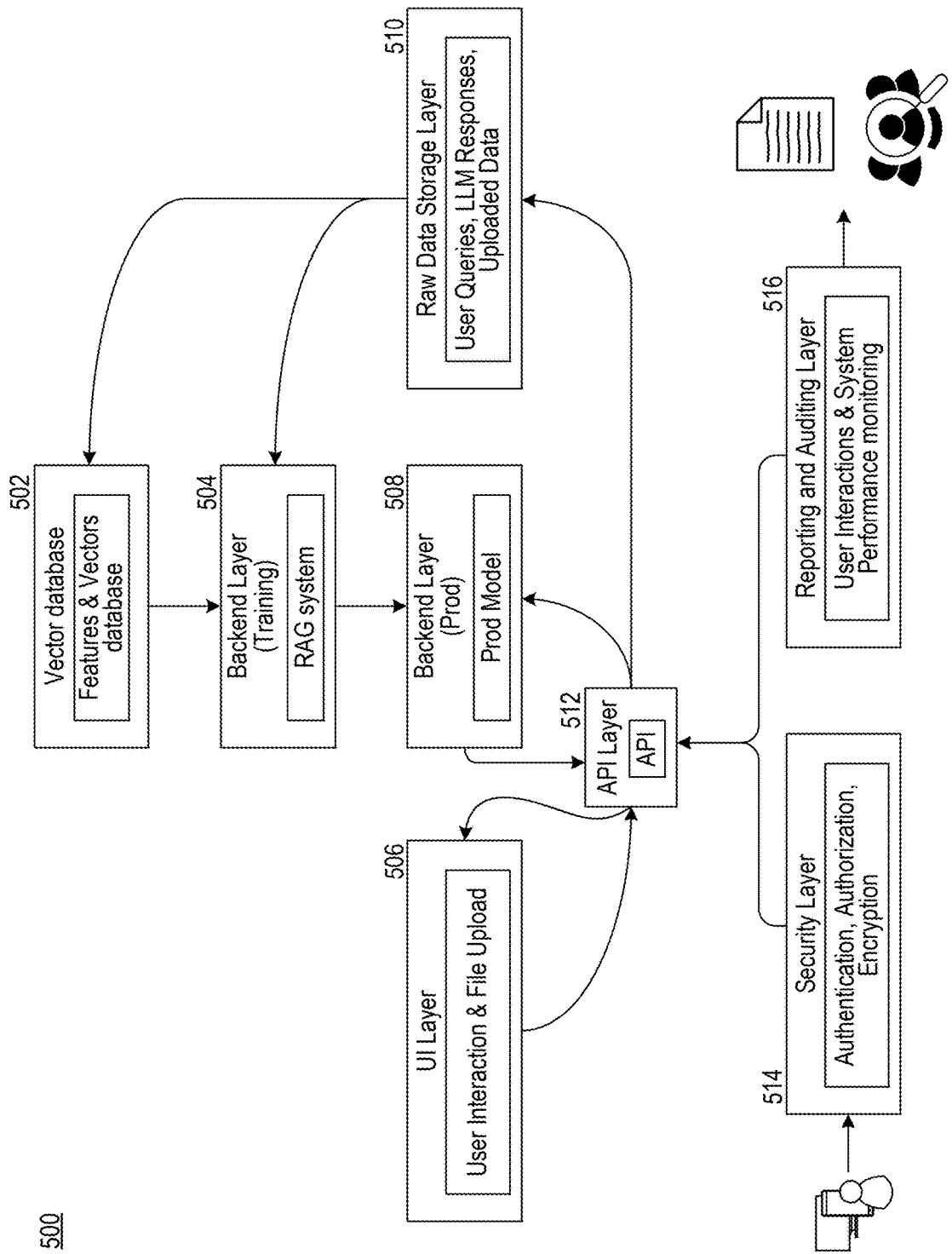
FIG. 5 illustrates a subsystem architecture for providing customized responses to query sets, in accordance with one or more implementations of this disclosure.

FIG. 5 illustrates a subsystem architecture 500 for providing customized responses to query sets, in accordance with one or more implementations of this disclosure. As shown in FIG. 5, the subsystem architecture 500 can involve a security layer 514 for requests, queries, documents, or other inputs. For example, the security layer includes authentication, authorization, encryption, and any other security measures relevant to the inputs. Authentication can require users to log in and authenticate themselves to ensure that only authorized users or systems are able to access the query response system. In some implementations, users are required to verify their identity through credentials such as usernames, passwords, or biometric data. Authorization can control the level of access granted to different users, ensuring that they can only perform actions or access data that they are permitted to. Encryption can protect the data in transit and at rest, ensuring that sensitive information remains confidential and secure from unauthorized access or tampering. Additionally, the security layer can include measures such as intrusion detection systems, regular security audits, and compliance with relevant data protection regulations. By implementing the security layer 514, the integrity and confidentiality of the inputs can be maintained, safeguarding the system against potential security threats and ensuring that the data remains protected.

A reporting and auditing layer 516 can ensure comprehensive monitoring and accountability. The reporting and auditing layer 516 can collect and analyze data from various components of the system, including user queries, LLM responses, and uploaded data, to generate detailed reports and audit trails. By doing so, the reporting and auditing layer 516 can provide valuable insights into system performance, user behavior, and data integrity. These reports can then be fed into an API layer 512, which can use the information to enforce security policies, optimize system operations, and ensure compliance with regulatory requirements. Additionally, the reporting and auditing layer 516 can help identify anomalies, detect potential security breaches, and support forensic investigations by maintaining a thorough and accurate record of all system activities. The reporting and auditing layer 516 can also generate outputs including detailed reports and audit trails for review by various organizations or individuals.

The API layer 512 can serve as an intermediary between the security layer 514, the reporting and auditing layer 516, and the backend layers. This API layer can facilitate communication by translating and forwarding requests from the security layer 514 and the reporting and auditing layer 516 to the backend systems, ensuring that the data is accessed and processed correctly. Additionally, the API layer 512 can enforce security protocols and policies defined by the security layer 514 and the reporting and auditing layer 516, such as authentication and authorization checks and auditing protocols, before allowing any data transactions to occur. By doing so, the API layer 512 can help maintain the integrity and security of the system while providing a structured and efficient means of handling queries and responses.

The subsystem architecture 500 can further include a UI layer 506. The UI layer 506 can facilitate user interactions and file uploads of query sets and documents. Connected to the API layer 512, the UI layer 506 can provide an intuitive and user-friendly interface that allows users to easily input queries and upload documents. This layer can handle the presentation of data, ensuring that users can interact with the system seamlessly. By leveraging the functionalities of the API layer, the UI layer can ensure that user inputs are correctly processed and transmitted to the backend systems for further handling. Additionally, the UI layer can offer features such as drag-and-drop file uploads, real-time feedback, and error handling to enhance the overall user experience.

In some implementations, the response generation process begins when the query response system receives an input document including a number of queries. As previously discussed, the input document can be a DDQ or other type of document. In some implementations, the input is a request, a query, a set of queries, or another format. A query can be a question, a request, a statement, an instruction, or another type of input.

The query response system can then process these inputs to identify the specific information being sought. This can involve parsing the document to extract individual queries and categorizing them based on their nature and complexity. Once the queries are identified, they can be input, uploaded, or otherwise transmitted to users or systems for processing. In some implementations, the query response system can receive the input from a user who has performed a login operation. For example, the user can log in using a secure authentication method (e.g., the security layer 514), such as a username and password, multi-factor authentication, or biometric verification. Once authenticated, the user can upload the input document through a user interface provided by the query response system. In some implementations, the query response system can use the login operation performed by the user to determine or predict user information. As an example, the user information can be used to tailor or customize responses to the particular user. Different types of users, such as individuals, organizations, governments, clients, and other types, can have distinct roles and requirements.

The system can extract various data points from the login operation, such as the user's credentials, access level, and historical usage patterns, to predict the user type. For example, an individual user can have a personal account with a history of accessing specific services or information, while an organization can have multiple users with varying access levels and a focus on collaborative tools and resources. Government users can require access to regulatory information and public data, while clients can require customized support and service-related information. By identifying the type of user, the system can tailor its responses to better suit the specific needs or contexts of each user. For individuals, the system can provide personalized content and recommendations, while for organizations, it can offer collaborative tools and enterprise-level support. Government users can receive detailed regulatory information and public service tools, while clients can be provided with customized support and service updates. By leveraging the data extracted from the login operation, the query response system can enhance its ability to deliver relevant and customized responses, improving the overall user experience for each distinct user type.

In some implementations, the query response system inputs, into a first AI system (e.g., a first LLM), the user information based on the login operation to obtain a determination that the user is a first type of user. For example, the first type of user is a representative of a foreign government. This determination can enable the system to customize its responses and services to the specific needs of the identified user type. For instance, if the user is identified as a representative of a foreign government, the system can prioritize providing detailed regulatory information, international policy updates, and public service tools relevant to governmental operations. In some implementations, the type of user can include a location associated with the user. For example, a location can be ascertained from an Internet protocol (IP) address, global positioning system (GPS) location, system configuration settings, language settings, or other information associated with a device used by the user to perform the login operation. The location associated with the user can impact the outputs provided to the user, as discussed below. In some implementations, the query response system cross-references multiple location indicators to verify the location of the user. For example, a location of the device can indicate that a user performed the login operation from within the United States. However, if another location indicator is indicative of a location outside the United States, the query response system can determine that the user's location is uncertain. The query response system can launch another process for investigating the user's location or the query response system can limit the user's access to global information (e.g., data tagged as "Global," as discussed in greater detail below).

In some implementations, the first AI system includes a first LLM that is trained to determine user types based on contextual information obtained from login operations. This training process can involve feeding the first AI system a diverse set of login data, which includes various attributes such as user roles, access levels, geographic locations, and historical interaction patterns. By analyzing this contextual information, the first AI system can learn to recognize patterns and correlations that are indicative of specific user types. For example, the system can identify whether a user is an individual consumer, a corporate client, a government official, or a service provider based on their login credentials, the frequency of their logins, the types of queries they submit, and other relevant metadata. This contextual analysis can be further enhanced by incorporating additional data sources, such as user profiles, previous interactions, and organizational hierarchies. As a result, the first AI system can make more accurate and nuanced determinations about user types, enabling the query response system to deliver highly personalized and contextually relevant responses.

Once the first AI system outputs a type of user, the query response system can perform searches for data relevant to the queries subject to constraints associated with the type of user. For example, the query response system can use the search subsystem 166, as shown in FIG. 1, to perform the searches. For example, for each query, the query response system can first perform a local search relating to the query. The query response system can search within a cache of stored data previously retrieved from a database or from a plurality of databases. For example, the cache can store recently retrieved data or data relating to frequently asked queries. By leveraging the cache of stored data, the system can significantly reduce the need to utilize an LLM for every query, thereby conserving computational resources and improving response times. This approach can be particularly beneficial in scenarios where the cached data is sufficient to provide accurate and relevant answers, eliminating the need for more resource-intensive operations. The query response system can constrain the search based on type of user, the query, and metadata of that query. For example, when receiving a query with metadata information indicating "custodian," the query response system can constrain its search to a set of libraries and folders as opposed to the entire cache. Additionally, in some implementations, the search is performed subject to one or more constraints associated with the type of user. By applying user-specific constraints, the system can ensure that the search results are customized to the unique requirements and permissions of the user, further enhancing the relevance and utility of the responses. The query response system can utilize LLMs or other resource-intensive techniques when a search of the cache fails to return relevant results for a given query.

Returning to FIG. 5, the query response system can perform the search within a raw data storage layer 510, within a cache of data pulled from the raw data storage layer 510, or within another source. The raw data storage layer 510 can be responsible for storing user queries, LLM responses, and uploaded data. This layer can act as a repository where all incoming data is securely stored in its original, unprocessed form. By maintaining the raw data, the system can ensure that there is a comprehensive record of all interactions and transactions, which can be crucial for auditing, troubleshooting, and further analysis. The raw data storage layer can facilitate efficient data retrieval and management, allowing backend processes to access and manipulate the data as needed. Additionally, this layer can support data integrity and consistency by implementing robust storage mechanisms and redundancy protocols. In some implementations, AI systems can also perform searches of the raw data storage layer 510.

For example, based on a failure of a search to return relevant results for a query, the query response system can use a second AI system to perform a search of a database. In some implementations, the second AI system is the same as the first AI system and is prompted to perform different operations. In some implementations, the second AI system is separate from the first AI system. The query response system can input, into the second AI system, the query and a prompt to obtain data that is relevant to the query and that is customized to the first type of user. In some implementations, the second AI system can retrieve data from one or more databases, subject to constraints based on types of users, the query, or metadata associated with the query. For example, when receiving a query with metadata information indicating "custodian," the query response system can constrain its search to a set of libraries and folders as opposed to the entire database.

In some implementations, the second AI system includes a RAG framework, as described below in greater detail in relation to FIG. 6. RAGs can combine the strengths of retrieval-based methods and generative models to provide comprehensive and contextually appropriate responses. By incorporating user-specific constraints, the second AI system can ensure that the retrieved data is not only relevant but also aligned with the specific needs and permissions of the user. This dual-layered approach allows the query response system to balance efficiency and accuracy, using the cache for quick and resource-saving searches while relying on the advanced capabilities of the RAG for more challenging queries. In some implementations, the query response system uses the second AI system to perform the search independent of a search of the cache of data. For example, the search of the cache of data is not performed or the query response system uses the second AI system to perform the search of the databases in addition to performing the search of the cache of data.

In some implementations, the second AI system is located in a backend layer 508. In some implementations, the second AI system includes a production model. The second AI system can include the backend layer 504, which involves a RAG system. In some implementations, the backend layer 504 can use training data, historical data, or other data stored in the raw data storage layer 510 to train any part of the second AI system in the backend layer 508. The training process can also utilize a vector database 502, which can include features and vectors representing data in the raw data storage layer 510. For example, the RAG system can access the vector database 502 to perform similarity analyses between vectors during the training or production processes. In some implementations, the API layer 512 further facilitates communications between the backend layer 508, which includes the second AI system, and the UI layer 506. For example, responses generated in the backend layer 508 can be transmitted to the UI layer 506 by the API layer 512 for output to a user.

In some implementations, the query response system maintains or modifies metadata associated with stored data in the one or more databases. For example, the query response system can modify the metadata associated with stored data to include tags indicating descriptions of the stored data. These descriptions can include geographic tags, as discussed below, semantic indicators, categories, permission levels, or other descriptors. The second AI system can retrieve the data from the one or more databases based on the tags. For example, the second AI system performs the search of the databases, taking into account the tags associated with the stored data. This tagging system can enhance the efficiency and accuracy of data retrieval by allowing the second AI system to quickly filter and locate relevant information based on the metadata. Additionally, the use of tags can facilitate more complex queries that involve multiple criteria, such as combining geographic and semantic tags to find data that is both location-specific and contextually relevant.

In some implementations, databases or other storage locations can include geographic labels indicating the data that relates or is available within each region. For example, certain database data can be labeled as "Global," meaning that the data can be accessed without regional restrictions. This global labeling facilitates seamless data retrieval and utilization across regions, ensuring that users can access the information they need without encountering geographical barriers. However, some data is not labeled as "Global" and can have specific regional tags. These regional tags can indicate that the data is subject to access restrictions based on geographical location of the user (e.g., based on IP address, GPS location, or other location indicator associated with the user). As an illustrative example, if a location associated with a device of the user indicates that the user is located within the United States and the query response system verifies this information, the query response system can search for data labeled with "Global" or "United States" tags. For the subset of data available to the user based on the user's location, compliance and risk procedures can be followed to determine when and how the data can be accessed. These procedures can ensure that the data is handled in accordance with relevant regulations and organizational policies. By adhering to these protocols, the system can maintain a high standard of data security and regulatory compliance, while still providing robust and flexible data access to its global user base.

In some implementations, the query response system can collect and analyze user activity to enhance its performance and accuracy over time. For example, users can filter specific folders and direct the second AI system to search for data exclusively within those selected folders. By collecting data on these user interactions, the query response system can identify patterns and preferences in how users filter and access information. This information can be used to optimize future queries, as the second AI system can learn from past user behavior to anticipate which folders or data sources are most relevant for certain types of queries. Over time, this adaptive learning process can improve the efficiency and precision of the query response system, ensuring that it retrieves the most pertinent information based on the user's historical filtering choices.

Figure 6:
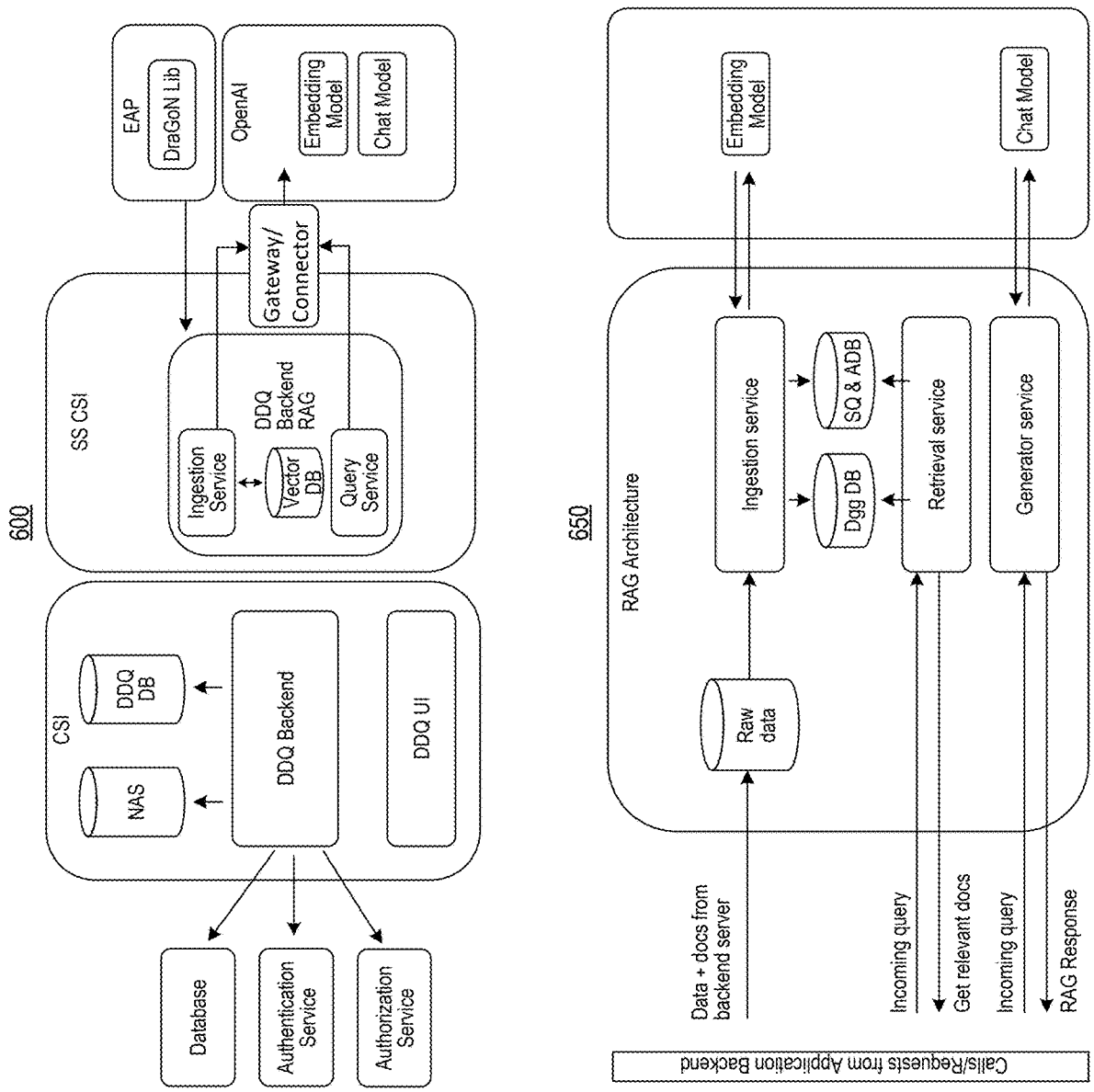
FIG. 6 illustrates example architectures for providing customized responses to query sets, in accordance with one or more implementations of this disclosure.

FIG. 6 illustrates an example architecture 600 for providing customized responses to query sets, in accordance with one or more implementations of this disclosure. As shown in FIG. 6, the example architecture 600 can include a chat model for interfacing with clients and receiving requests via chat and an embedding model for generating embeddings of queries submitted by users. The example architecture 600 further includes a backend RAG for retrieving data and generating responses, which includes an ingestion service, a vector database for efficient similarity search and embedding retrieval, and a query service. In some implementations, the example architecture 600 includes a DDQ UI for receiving inputs of DDQs or other documents or inputs. On the backend, the system can access a network-attached storage (NAS), a database, or other sources of data to locate data relevant to queries. In some implementations, the system also accesses other databases, authentication services, authorization services, or other services in the process of determining responses to queries. In some implementations, other architectures or a combination of architectures can be utilized herein.

FIG. 6 further illustrates an example architecture 650 for providing customized responses to query sets, in accordance with one or more implementations of this disclosure. The example architecture 650 illustrates a RAG architecture, for example, representing an example architecture involve the second AI system. As shown in the example architecture 650, a first layer can include a chat model and an embedding model for receiving queries and converting the queries to embeddings for similarity analysis. The RAG architecture can include an ingestion service, which can receive both the embeddings of the queries and data and documents from backend servers. The RAG architecture further includes both retrieval and generator services. The retrieval service can receive queries and retrieve relevant data and documents from various sources, including databases, applications, or other sources. The generator service generates a response, based on the query and outputs the RAG response.

In some implementations, for each query, the data that is relevant to the query is identified by the second AI system in multiple sources within the one or more databases. For example, the second AI system can identify every relevant instance of data relevant to the query and can retrieve each instance. The system can then aggregate these instances to form a comprehensive listing that encompasses all the relevant information across various sources. This aggregated dataset can be used to cross-verify the accuracy and consistency of the information. By comparing the retrieved instances, the system can identify any discrepancies or variations in the data. If inconsistencies are found, the system can flag these for further review or discard conflicting data, as discussed below, to ensure that only reliable and consistent information is used in the final response.

In some implementations, the query response system performs various checks on the responses before they are approved. In some implementations, the outputs from the second AI system are reviewed and validated by a second type of user, such as a subject matter expert (SME) or supervisor. This second type of user can read through and edit the provided content. This user can ask the second AI system or LLM for another answer if the initial response is unsatisfactory or make adjustments and provide human feedback to the query response system to improve future outputs. Additionally, workflow tools can be integrated to streamline the process, eliminating the need to create a template first draft and allowing the SME or supervisor to remain on-platform within the query response system throughout the entire process. For example, the second type of users can log in, make edits, and certify a response as approved. The validation process can be audited and controlled by access permissions. Auditing and logging mechanisms can provide additional inputs and guardrails, ensuring that all actions are tracked and that the query response system maintains high standards of accuracy and accountability. In some implementations, this validation process is enabled or facilitated by another model or AI system.

In some implementations, to address hallucinations in AI responses, the query response system can create a draft that includes sentences directly copied from reliable sources, complete with citations. This draft can serve as a benchmark for comparison, ensuring that the information provided by the second AI system is accurate and verifiable. If the second AI system cannot retrieve relevant data, it can be programmed to output a "not found" response. In some implementations, the query response system can retrieve data in other forms, such as fragments of data or structured data, such as tables or graphs. Additionally, the query response system can access multimedia content, including images, audio recordings, and videos, to corroborate the textual information. For instance, an image with annotated data or a video transcript can provide visual or auditory confirmation of the facts presented in the text. The system can also utilize geospatial data, such as maps and geographic information system (GIS) data, to verify location-based information. This multi-modal approach can significantly enhance the reliability and robustness of the information provided to the users.

In some implementations, the query response system can determine whether the data that is relevant to the query is an exact match with every one of the multiple sources. In some implementations, the query response system determines that the data that is relevant to the query is not an exact match with every one of the multiple sources. Based on the determination, the query response system can refrain from using the data. For example, the query response system can discard any data that is not an exact match. The query response system can refrain from inputting any data that is not an exact match into the third AI system to obtain the response to the query. In some implementations, the query response system can refrain from outputting any data that is not an exact match to the user. In some implementations, the query response system can discard the entire output based on one or more instances of the retrieved data failing to match the sources exactly.

The query response system can use other methods of verifying the accuracy of the data that is relevant to the query. For example, the query response system can conduct a similarity analysis between sentences that are not exact matches. The query response system can compare sentences retrieved from the databases to each other, can compare sentences retrieved from the database to the sources within the database, or can conduct another comparison. The comparisons can involve using NLP techniques to measure the semantic similarity between the sentences. The query response system can perform a vector analysis, which can be implemented using word embeddings or sentence embeddings. In vector analysis, each word or sentence can be represented as a vector in a high-dimensional space. These vectors can capture the semantic meaning of the words or sentences based on their context within a large corpus of text. Techniques such as Word2Vec, GloVe, or models including BERT and GPT models can be used to generate these embeddings. Once the sentences are converted into vectors, the query response system can measure the similarity between them using various mathematical methods. One approach is cosine similarity, which calculates the cosine of the angle between two vectors. The cosine similarity score ranges from −1 to 1, where a score closer to 1 indicates high similarity. Another method is the Euclidean distance, which measures the straight-line distance between two vectors in the high-dimensional space. A smaller Euclidean distance indicates higher similarity. By analyzing the vectors, the system can determine if the sentences convey similar meanings, even if they are not exact matches. If the similarity score meets a similarity threshold, the system can approve the data for use. For example, the query response system can include the relevant sentence in the set of data retrieved by the second AI system and input into a third AI system or output to a user. This approach can help ensure that the responses are accurate and contextually relevant, even if they are not exact matches. Additionally, vector analysis can be combined with other techniques, such as syntactic parsing and semantic role labeling, to further enhance the accuracy and reliability of the query response system.

Another method of assessing similarity is a consensus-based approach. This method involves aggregating the information from multiple sources and identifying commonalities among them. By comparing the sentences retrieved from different databases, the system can determine the degree of agreement or consensus among the sources. Sentences that exhibit a high level of similarity across multiple sources can be considered more reliable and accurate. This approach can mitigate the risk of relying on a single source that can contain errors or biases. The consensus-based approach can be particularly useful in scenarios where the data is fragmented or where there are multiple interpretations of the same information.

Another technique for performing similarity analyses involves using multiple LLMs to resolve discrepancies and validate information. This can be achieved by employing both validation LLMs and resolver LLMs. Validation LLMs can be used to cross-check the retrieved sentences against a set of reference sentences from reliable sources. These models can assess the semantic similarity between the sentences and determine whether they convey the same meaning. By using multiple validation LLMs, the system can ensure that the validation process is robust and that the results are not biased by the limitations of a single model. The validation LLMs can provide a confidence score for each sentence, indicating the likelihood that it matches the reference sentences. Resolver LLMs can be used to address cases where the validation LLMs identify discrepancies or where the sentences are not exact matches. These models can analyze the context and semantics of the sentences to determine the most accurate and relevant information. Resolver LLMs can employ advanced natural language processing techniques, such as contextual embeddings and attention mechanisms, to understand the nuances of the sentences. By synthesizing the information from multiple sources, resolver LLMs can generate a coherent and accurate response that resolves any inconsistencies. This approach can be particularly useful in complex queries where the information is not straightforward and requires a deeper understanding of the context.

The query response system can apply weights to all instances of the data retrieved from databases. This technique involves assigning different weights to sentences based on their importance and relevance to the query. Some sentences can contain critical information that is essential for the accuracy of the response, and these sentences can be weighted higher. For example, sentences that provide key facts, figures, or direct answers to the query can be given more weight compared to supplementary or contextual information. The query response system can then perform the methods discussed herein with the applied weights in order to prioritize the most important data.

By comparing sentences retrieved from the sources using any of the methods discussed herein, the query response system can also assess the completeness of the retrieved responses. For example, if a complete answer includes ten sentences and the second AI system pulls seven sentences, the response has 70% completeness. In some implementations, the query response system can discard any sentences that are not exact matches with the reference data or that do not satisfy similarity requirements with the reference data, as discussed above. The query response system can assess the completeness of the data retrieved by the second AI system after discarding any data that does not match the stored data. For example, the second AI system pulls seven sentences but discards two due to insufficient matching with the sources. In this case, the completeness is 50%, as there are five remaining sentences and the complete answer includes ten sentences. In some implementations, the query response system can compare the completeness score to a completeness threshold, below which the query response system refrains from using the data. For example, the query response system can require a completeness of 80% in order to use data in a response. In the above example, the query response system refrains from using the retrieved data due to insufficient completeness of the data. For example, the query response system can discard any data that is deemed incomplete. The query response system can refrain from inputting this data into the third AI system to obtain the response to the query. In some implementations, the query response system can refrain from outputting the data to the user. In some implementations, the query response system can discard the entire output based on incompleteness. This method further allows the query response system to measure the accuracy and reliability of the AI system's output.

In some implementations, the query response system creates flags or triggers review upon discovering discrepancies in stored data. In some implementations, the query response system flags any responses generated based on inconsistent information or otherwise denotes that the response should be verified for accuracy. In some implementations, the system can automatically escalate the flagged discrepancies to a higher level of review, involving subject matter experts or specialized personnel who can provide a more thorough analysis. For example, the query response system can generate a request that the conflicting information stored in the databases be manually reviewed and resolved. Additionally, the system can log these discrepancies and track their resolution status, ensuring that any recurring issues are identified and addressed promptly. The query response system can also provide detailed reports on the nature and frequency of the discrepancies, which can be used to improve the data quality and the overall reliability of the system.

In some implementations, once the query response system has approved the data identified by the second AI system for each query, the query response system can use a third AI system to formulate a response that conforms to various formatting, stylistic, or other requirements. For example, the query response system inputs, into a third AI system, the data that is relevant to the query and that is customized to the first type of user to obtain a response to the query that conforms to a particular style. In some implementations, the particular style is based on the type of user. For instance, if the user is a corporate client, the response can need to adhere to a formal and professional tone, with precise language and structured formatting. Conversely, if the user is an individual consumer, the response can be more conversational and accessible. In some implementations, the particular style is based on the query response system. For example, the query response system can conform each response output by the system to a consistent style, regardless of the type of user.

In some implementations, the third AI system is trained to verify the internal consistency of each response in a document as well as with similar documents (e.g., across products, services, jurisdictions, client segments, etc.). In some implementations, the third AI system is trained to conform responses to a particular style, such as syntax, structure, or presentation. This third AI system can be specifically designed to ensure that the responses are not only accurate and relevant but also presented in a manner that meets the user's expectations and organizational standards. The third AI system can be trained on a variety of stylistic guidelines, including industry-specific jargon, preferred formatting conventions, and even branding elements, to ensure that each response is appropriately customized. This capability allows the query response system to deliver high-quality, polished responses that enhance user satisfaction and maintain consistency across all communications. By leveraging the third AI system, the system can effectively bridge the gap between raw data and user-friendly output, ensuring that every interaction is both informative and engaging.

Once the query response system has formulated responses to the plurality of queries, it can compile these responses into an output document, or artifact, for transmission to the user. For example, the query response system can use the compilation subsystem 168, as shown in FIG. 1, to compile the responses. This compilation process involves aggregating the individual responses, ensuring that they are organized in a coherent and logical manner. The artifact can be formatted to enhance readability and usability, incorporating elements such as headings, bullet points, and tables to present the information clearly. Additionally, the document can be customized to meet any specific requirements or preferences of the user, such as including a summary section, highlighting key points, or providing references to relevant sources. By compiling the responses into a single, comprehensive document, the query response system can deliver a cohesive and professional output that facilitates easy access to the requested information. This approach not only streamlines the communication process but also ensures that the user receives a well-structured and informative document that addresses all their queries effectively.

Figure 7:
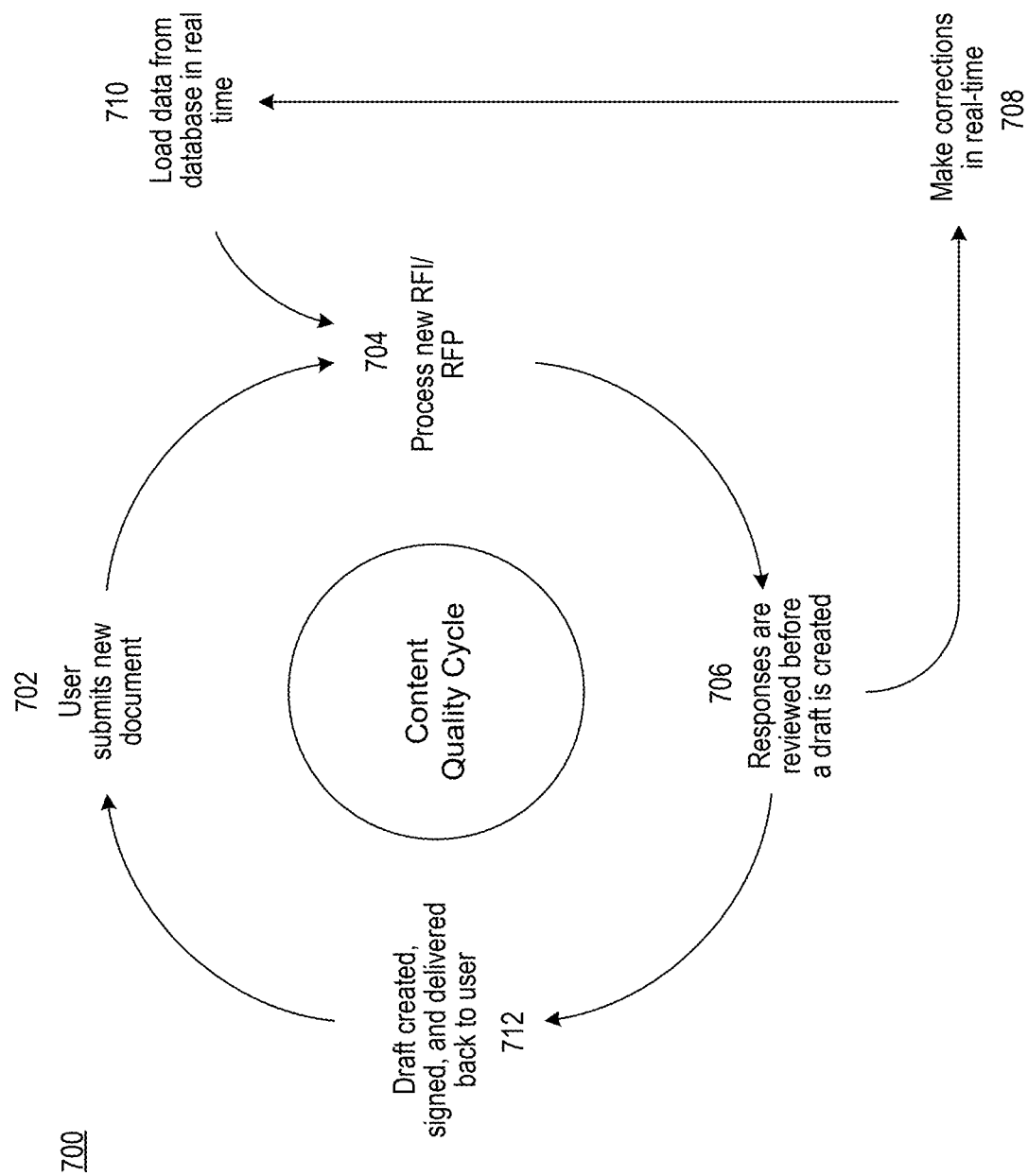
FIG. 7 illustrates a cyclic flow for providing customized responses to query sets, in accordance with one or more implementations of this disclosure.

FIG. 7 illustrates a cyclic flow 700 for providing customized responses to query sets, in accordance with one or more implementations of this disclosure. The cyclic flow 700 can be used to ensure quality of responses before they are output to users. The cyclic flow 700 can include, at 702, a user submitting a new document including a number of queries. The new document prompts a new request for information (RFI) or request for proposal (RFP) by the query response system at 704. Once data is retrieved, the query response system reviews responses before creating a draft of the artifact at 706. At 708, the query response system can make corrections in real time, as needed, and load or retrieve updated data from the database to supplement or cross reference the responses at 710. When responses are finalized, they are compiled into a draft document, which is approved and transmitted to the user at 712. The cyclic flow 700 continues when the user submits a new input document for processing at 702.

Figure 8:
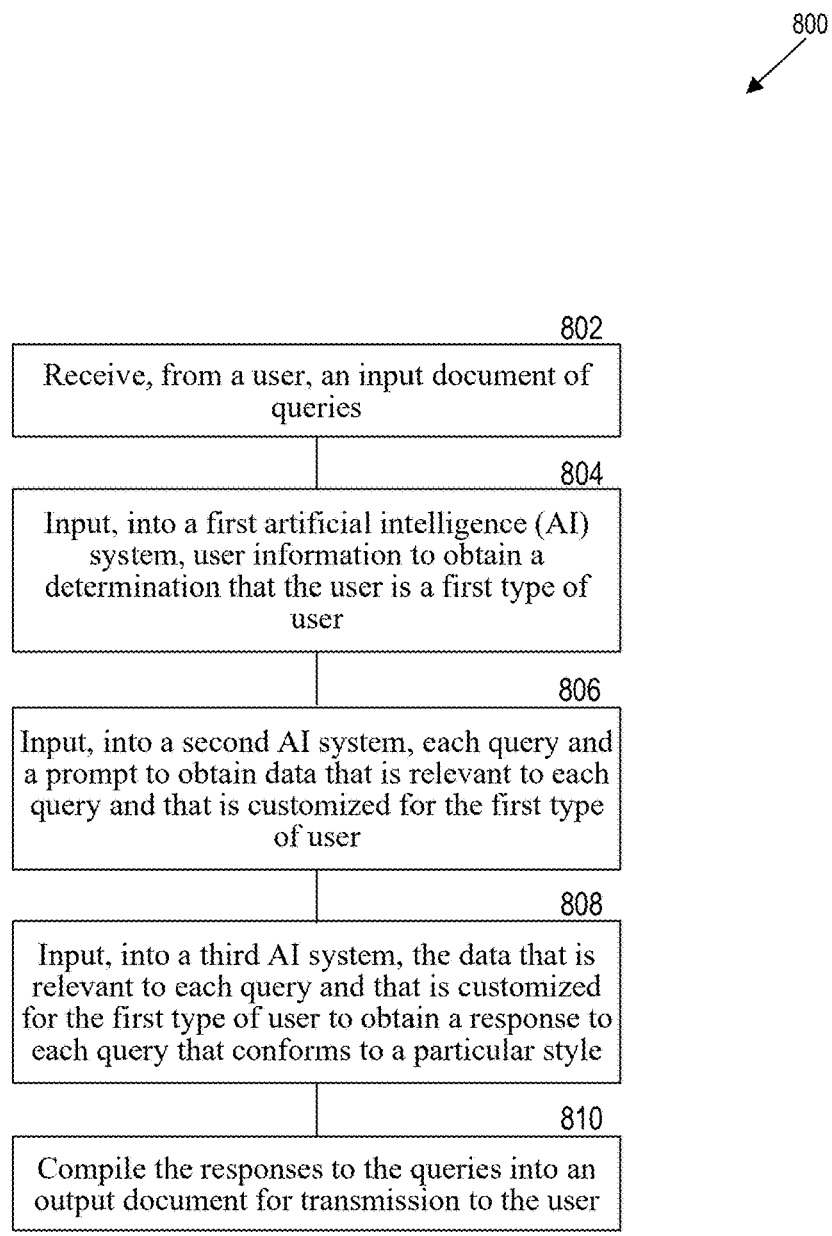
FIG. 8 is a flowchart of operations for providing customized responses to query sets, in accordance with one or more implementations of this disclosure.

FIG. 8 is a flowchart 800 of operations for providing customized responses to query sets, in accordance with one or more implementations of this disclosure. The method 800 includes receiving, at operation 802, an input document of queries from a user. For example, the input document can include a number of queries that require responses based on relevant data stored in data sources. The flowchart 800 includes inputting, at operation 804, into a first AI system, user information to obtain a determination that the user is a first type of user. In some implementations, the first AI system is trained to determine user types based on contextual information obtained from login operations. The user type can be determined based on a login operation performed by the user. The user type can be used to determine relevant and accessible data. The method 800 includes inputting, at operation 806, into a second AI system, each query and a prompt to obtain data that is relevant to each query and that is customized for the first type of user. In some implementations, the second AI system is the same as the first AI system and is prompted to perform different operations. In some implementations, the second AI system can be a RAG framework that can retrieve data from the database, subject to constraints based on types of users. The flowchart 800 includes inputting, at operation 808, into a third AI system, the data that is relevant to each query and that is customized for the first type of user to obtain a response to each query that conforms to a particular style. In some implementations, the third AI system is trained to conform responses to the particular style, such as syntax, structure, or presentation. The flowchart 800 includes compiling, at operation 810, the responses to the queries into an output document for transmission to the user.

Figure 9:
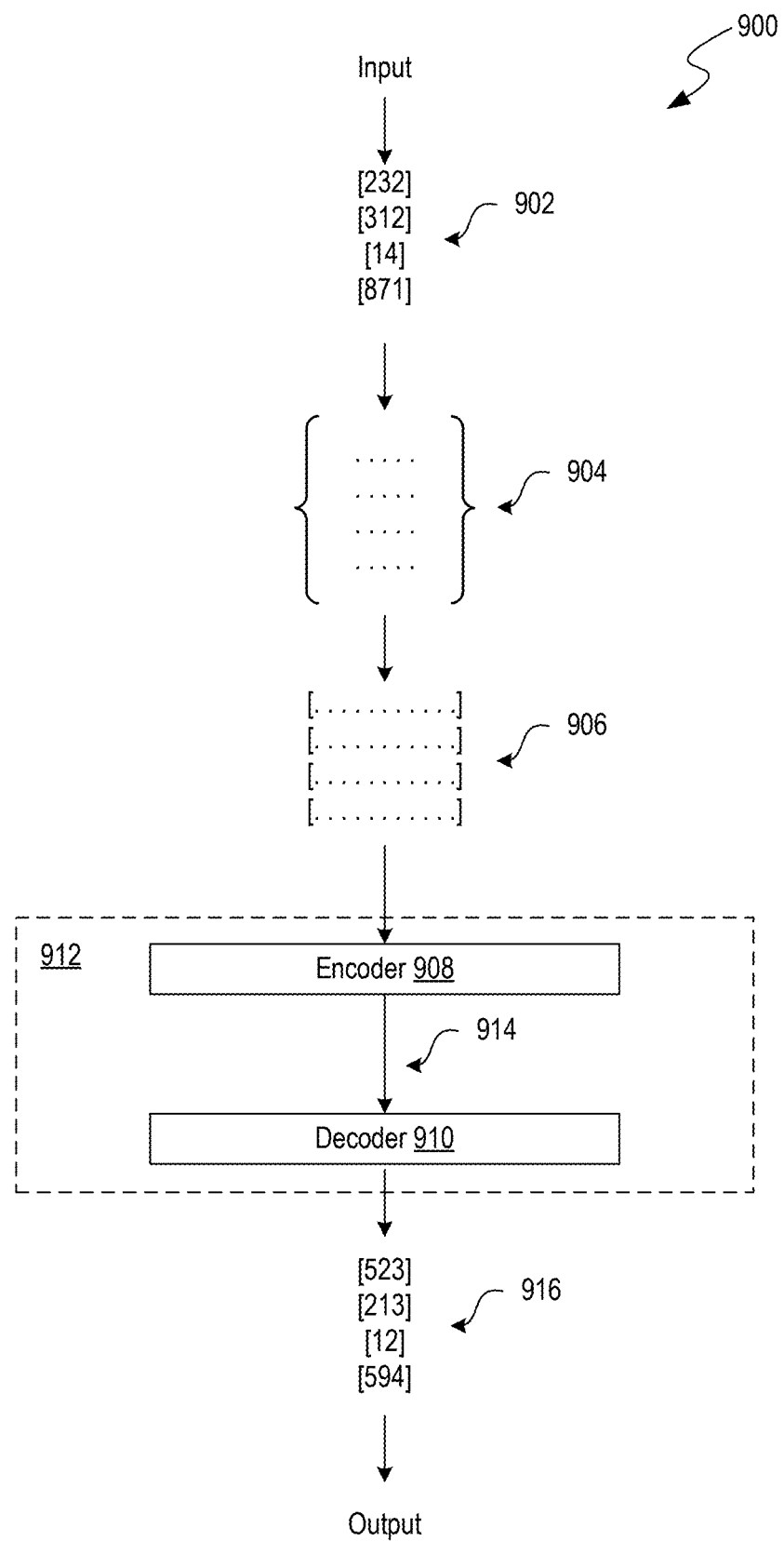
FIG. 9 is a block diagram of an example transformer used to provide customized responses to query sets, in accordance with one or more implementations of this disclosure.

FIG. 9 is a block diagram 900 of an example transformer 912 used to provide customized responses to query sets, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures such as RNN-based language models.

The transformer 912 includes an encoder 908 (which can include one or more encoder layers/blocks connected in series) and a decoder 910 (which can include one or more decoder layers/blocks connected in series). Generally, the encoder 908 and the decoder 910 each include multiple neural network layers, at least one of which can be a self-attention layer. The parameters of the neural network layers can be referred to as the parameters of the language model.

The transformer 912 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 912 is trained to perform certain functions on other input formats than natural language input. For example, the input can include objects, images, audio content, or video content, or a combination thereof.

As described herein, such a model can be used in order to generate commands, e.g., such as those to effectuate operations for providing customized responses to query sets, as well as for potentially transmitting data from those operations to the system.

The transformer 912 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 9 illustrates an example of how the transformer 912 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the block diagram 900, a short sequence of tokens 902 corresponding to the input text is illustrated as input to the transformer 912. Tokenization of the text sequence into the tokens 902 can be performed by some pre-processing tokenization module such as, for example, a byte-pair encoding tokenizer (the "pre" referring to the tokenization occurring prior to the processing of the tokenized input by the LLM), which is not shown in FIG. 9 for brevity. In general, the token sequence that is inputted to the transformer 912 can be of any length up to a maximum length defined based on the dimensions of the transformer 912. Each token 902 in the token sequence is converted into an embedding 906 (also referred to as "embedding vector").

An embedding 906 is a learned numerical representation (such as, for example, a vector) of a token that captures some semantic meaning of the text segment represented by the token 902. The embedding 906 represents the text segment corresponding to the token 902 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 906 corresponding to the "write" token will be closer to another embedding corresponding to the "jot down" token in the vector space as compared to the distance between the embedding 906 corresponding to the "write" token and another embedding corresponding to the "summary" token.

The vector space can be defined by the dimensions and values of the embedding vectors. Various techniques can be used to convert a token 902 to an embedding 906. For example, another trained machine learning model can be used to convert the token 902 into an embedding 906. In particular, another trained machine learning model can be used to convert the token 902 into an embedding 906 in a way that encodes additional information into the embedding 906 (e.g., a trained machine learning model can encode positional information about the position of the token 902 in the text sequence into the embedding 906). In some implementations, the numerical value of the token 902 can be used to look up the corresponding embedding in an embedding matrix 904, which can be learned during training of the transformer 912.

The generated embeddings, e.g., such as the embedding 906, are input into the encoder 908. The encoder 908 serves to encode the embedding 906 into feature vectors 914 that represent the latent features of the embedding 906. The encoder 908 can encode positional information (i.e., information about the sequence of the input) in the feature vectors 914. The feature vectors 914 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 914 that can be generated by the encoder 908 can be referred to as a latent space or feature space.

Conceptually, the decoder 910 is designed to map the features represented by the feature vectors 914 into meaningful output, which can depend on the task that was assigned to the transformer 912. For example, if the transformer 912 is used for a translation task, the decoder 910 can map the feature vectors 914 into text output in a target language different from the language of the original tokens 902. Generally, in a generative language model, the decoder 910 serves to decode the feature vectors 914 into a sequence of tokens. The decoder 910 can generate output tokens 916 one by one. Each output token 916 can be fed back as input to the decoder 910 in order to generate the next output token 916. By feeding back the generated output and applying self-attention, the decoder 910 can generate a sequence of output tokens 916 that has sequential meaning (e.g., the resulting output text sequence is understandable as a sentence and obeys grammatical rules). The decoder 910 can generate output tokens 916 until a special [EOT] token (indicating the end of the text) is generated. The resulting sequence of output tokens 916 can then be converted to a text sequence in post-processing. For example, each output token 916 can be an integer number that corresponds to a vocabulary index. By looking up the text segment using the vocabulary index, the text segment corresponding to each output token 916 can be retrieved, the text segments can be concatenated together, and the final output text sequence can be obtained.

In some implementations, the input provided to the transformer 912 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims which follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

Figure 10:
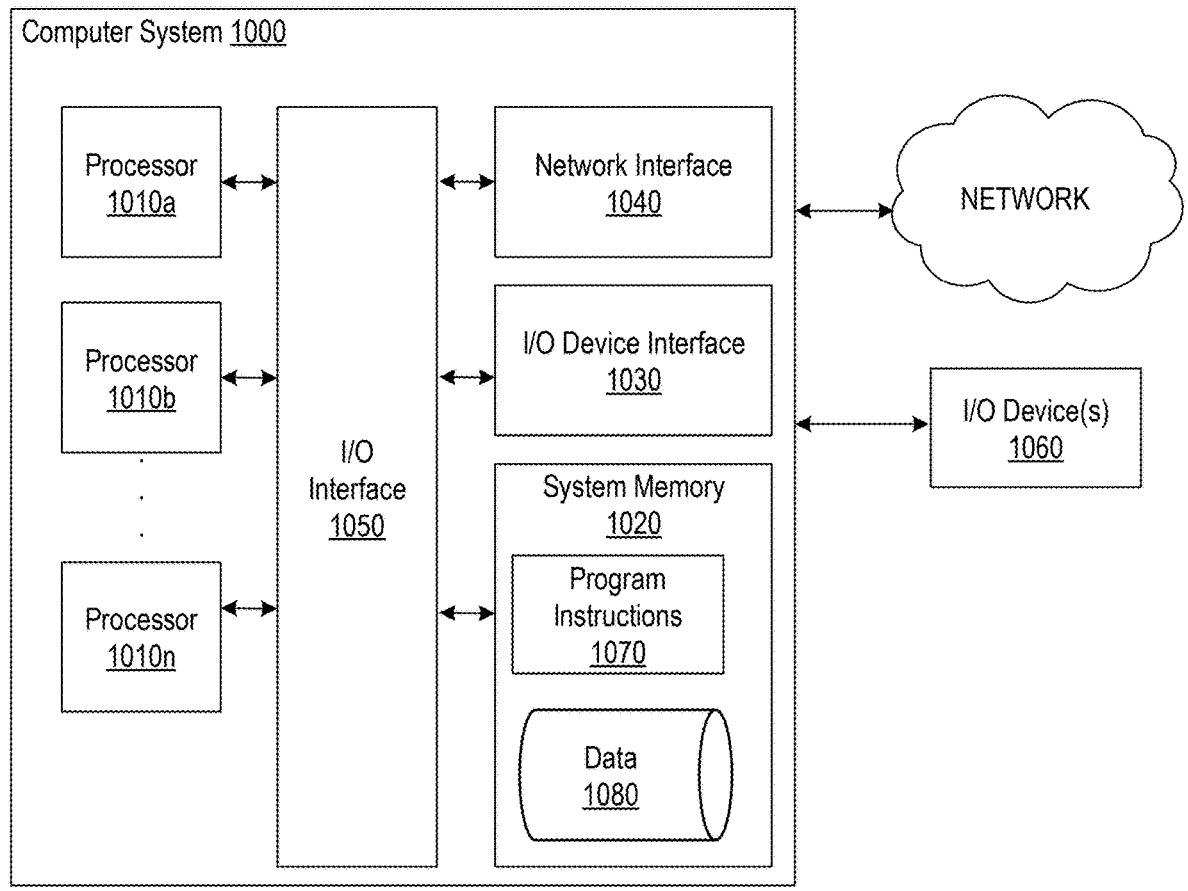
FIG. 10 illustrates an example computing system that can be used in accordance with some implementations of this disclosure.

FIG. 10 shows an example computing system that can be used in accordance with some implementations of this disclosure. In some instances, computing system 1000 is referred to as a computer system 1000. A person skilled in the art would understand that those terms can be used interchangeably. The components of FIG. 10 can be used to perform some or all operations discussed in relation to FIGS. 1-6. Furthermore, various portions of the systems and methods described herein can include or be executed on one or more computer systems similar to computing system 1000. Further, processes and modules described herein can be executed by one or more processing systems similar to that of computing system 1000.

Computing system 1000 can include one or more processors (e.g., processors 1010a-1010n) coupled to system memory 1020, an input/output (I/O) device interface 1030, and a network interface 1040 via an I/O interface 1050. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 1000. A processor can execute code (e.g., processor firmware, a protocol stack, a database management system, an operating system, or a combination thereof) that creates an execution environment for program instructions.

A processor can include a programmable processor. A processor can include general or special purpose microprocessors. A processor can receive instructions and data from a memory (e.g., system memory 1020). Computing system 1000 can be a uni-processor system including one processor (e.g., processor 1010a), or a multiprocessor system including any number of suitable processors (e.g., 1010a-1010n). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special purpose logic circuitry, e.g., an FPGA (field-programmable gate array) or an ASIC (application-specific integrated circuit). Computing system 1000 can include a plurality of computing devices (e.g., distributed computer systems) to implement various processing functions.

I/O device interface 1030 can provide an interface for connection of one or more I/O devices 1060 to computer system 1000. I/O devices can include devices that receive input (e.g., from a user) or output information (e.g., to a user). I/O devices 1060 can include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 can be connected to computer system 1000 through a wired or wireless connection. I/O devices 1060 can be connected to computer system 1000 from a remote location. I/O devices 1060 located on remote computer systems, for example, can be connected to computer system 1000 via a network and network interface 1040.

The I/O device interface 1030 and I/O devices 1060 can be used to enable manipulation of the three-dimensional model as well. For example, the user can be able to use I/O devices such as a keyboard and touchpad to indicate specific selections for nodes, adjust values for nodes, select from the history of machine learning models, select specific inputs or outputs, or the like. Alternatively or additionally, the user can use their voice to indicate specific nodes, specific models, or the like via the voice recognition device or microphones.

Network interface 1040 can include a network adapter that provides for connection of computer system 1000 to a network. Network interface 1040 can facilitate data exchange between computer system 1000 and other devices connected to the network. Network interface 1040 can support wired or wireless communication. The network can include an electronic communication network, such as the internet, a LAN, a WAN, a cellular communications network, or the like.

System memory 1020 can be configured to store program instructions 1070 or data 1080. Program instructions 1070 can be executable by a processor (e.g., one or more of processors 1010a-1010n) to implement one or more implementations of the present techniques. Program instructions 1070 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can or can not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 1020 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 1020 can include a non-transitory, computer-readable storage medium that can have program instructions stored thereon that are executable by a computer processor (e.g., one or more of processors 1010a-1010n) to cause the subject matter and the functional operations described herein. A memory (e.g., system memory 1020) can include a single memory device or a plurality of memory devices (e.g., distributed memory devices).

I/O interface 1050 can be configured to coordinate I/O traffic between processors 1010a-1010n, system memory 1020, network interface 1040, I/O devices 1060, or other peripheral devices. I/O interface 1050 can perform protocol, timing, or other data transformations to convert data signals from one component (e.g., system memory 1020) into a format suitable for use by another component (e.g., processors 1010a-1010n). I/O interface 1050 can include support for devices attached through various types of peripheral buses, such as a variant of the Peripheral Component Interconnect (PCI) bus standard or the Universal Serial Bus (USB) standard.

Implementations of the techniques described herein can be implemented using a single instance of computer system 1000 or multiple computer systems 1000 configured to host different portions or instances of implementations. Multiple computer systems 1000 can provide for parallel or sequential processing/execution of one or more portions of the techniques described herein.

Those skilled in the art will appreciate that computer system 1000 is merely illustrative and is not intended to limit the scope of the techniques described herein. Computer system 1000 can include any combination of devices or software that can perform or otherwise provide for the performance of the techniques described herein. For example, computer system 1000 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 1000 can also be connected to other devices that are not illustrated or can operate as a stand-alone system. In addition, the functionality provided by the illustrated components may, in some implementations, be combined in fewer components, or be distributed in additional components. Similarly, in some implementations, the functionality of some of the illustrated components can not be provided, or other additional functionality can be available.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

What is claimed is:

1. One or more non-transitory, computer-readable storage media comprising instructions recorded thereon, wherein the instructions, when executed by at least one data processor of a system, cause the system to:
receive, from a user who has performed a login operation, an input document comprising a plurality of queries;
input, into a first artificial intelligence (AI) system, user information based on the login operation to obtain a determination that the user is a first type of user,
wherein the first AI system is trained to determine user types based on contextual information obtained from login operations;
for each query of the plurality of queries:
perform a search relating to the query within a cache of stored data previously retrieved from one or more databases,
wherein the search is performed subject to one or more constraints associated with the first type of user;
based on a failure of the search to return relevant results, input, into a second AI system, the query and a prompt to obtain data that is relevant to the query and that is customized to the first type of user,
wherein the second AI system identifies the data that is relevant to the query in multiple sources within the one or more databases and retrieves data from the one or more databases, subject to constraints based on types of users;
compare each instance of the data that is relevant to the query between each of the multiple sources;
perform a similarity analysis between any instances that are not an exact match;
determine, based on the similarity analysis, whether a similarity of any instances that are not the exact match satisfies a similarity threshold;
when the similarity of any instances that are not the exact match does not satisfy a similarity threshold, refrain from inputting the data that is relevant to the query into a third AI system to obtain a response to the query; and
when the similarity of any instances that are not the exact match satisfies the similarity threshold, input, into the third AI system, the data that is relevant to the query and that is customized to the first type of user to obtain the response to the query that conforms to a particular style,
wherein the third AI system is trained to conform responses to the particular style, the particular style comprising one or more of syntax, structure, or presentation; and
compile a plurality of responses to the plurality of queries into an output document for transmission to the user.

2. The one or more non-transitory, computer-readable storage media of claim 1, wherein the instructions further cause the system to:
modify metadata associated with stored data in the one or more databases to include tags indicating descriptions of the stored data,
wherein the second AI system further retrieves the data from the one or more databases, based on the tags.

3. The one or more non-transitory, computer-readable storage media of claim 1, wherein the instructions further cause the system to:
determine that the data that is relevant to the query is not an exact match between each of the multiple sources; and
based on the determination that the data that is relevant to the query is not the exact match between each of the multiple sources, refrain from inputting the data that is relevant to the query into the third AI system to obtain the response to the query.

4. The one or more non-transitory, computer-readable storage media of claim 1, wherein the instructions further cause the system to:
determine a total number of sources storing the data that is relevant to the query;
perform a comparison between a number of the multiple sources and the total number of sources to determine a completeness score of an output generated by the second AI system, the output comprising the data that is relevant to the query;
determine, based on the comparison, that the completeness score does not satisfy a completeness threshold; and
based on the determination that the completeness score does not satisfy the completeness threshold, refrain from inputting the data that is relevant to the query into the third AI system to obtain the response to the query.

5. A method comprising:
receiving, from a user who has performed a login operation, an input comprising a plurality of queries;
inputting, into a first artificial intelligence (AI) system, user information based on the login operation to obtain a determination that the user is a first type of user,
wherein the first AI system is trained to determine user types based on contextual information obtained from login operations;
for each query of the plurality of queries:
inputting, into a second AI system, the query and a prompt to obtain, from one or more databases, data that is relevant to the query and that is customized to the first type of user,
wherein the second AI system identifies the data that is relevant to the query in multiple sources within the one or more databases and retrieves data from the one or more databases, subject to constraints based on types of users;
comparing each instance of the data that is relevant to the query between each of the multiple sources;
performing a similarity analysis between any instances that are not an exact match;
determining, based on the similarity analysis, whether a similarity of any instances that are not the exact match satisfies a similarity threshold;
when the similarity of any instances that are not the exact match does not satisfy a similarity threshold, refraining from inputting the data that is relevant to the query into a third AI system to obtain a response to the query; and
when the similarity of any instances that are not the exact match satisfies the similarity threshold, inputting, into the third AI system, the data that is relevant to the query and that is customized to the first type of user to obtain the response to the query that conforms to a particular style,
wherein the third AI system is trained to conform responses to the particular style; and
compiling a plurality of responses to the plurality of queries into an output for transmission to the user.

6. The method of claim 5, further comprising performing a search relating to the query within a cache of stored data previously retrieved from the one or more databases, and wherein inputting the query and the prompt into the second AI system is performed based on a failure of the search to return relevant results.

7. The method of claim 5, further comprising:
modifying metadata associated with stored data in the one or more databases to include tags indicating descriptions of the stored data,
wherein the second AI system retrieves the data from the one or more databases, based on the tags.

8. The method of claim 5, further comprising:
determining that the data that is relevant to the query is not an exact match between each of the multiple sources; and
based on the determination that the data that is relevant to the query is not the exact match between each of the multiple sources, refraining from inputting the data that is relevant to the query into the third AI system to obtain the response to the query.

9. The method of claim 5, further comprising:
determining a total number of sources storing the data that is relevant to the query;
performing a comparison between a number of the multiple sources and the total number of sources to determine a completeness score of an output generated by the second AI system, the output comprising the data that is relevant to the query;
determining, based on the comparison, that the completeness score does not satisfy a completeness threshold; and
based on the determination that the completeness score does not satisfy the completeness threshold, refraining from inputting the data that is relevant to the query into the third AI system to obtain the response to the query.

10. A system comprising:
a storage device; and
one or more processors communicatively coupled to the storage device storing instructions thereon, that cause the one or more processors to:
receive, from a user who has performed a login operation, a request;
input, into a first artificial intelligence (AI) system, user information based on the login operation to obtain a determination that the user is a first type of user,
wherein the first AI system is trained to determine user types based on contextual information obtained from login operations;
input, into a second AI system, the request and a prompt to obtain, from one or more databases, data that is relevant to the request and that is customized to the first type of user,
wherein the second AI system identifies the data that is relevant to the request in multiple sources within the one or more databases and retrieves data from the one or more databases, subject to constraints based on types of users;
compare each instance of the data that is relevant to the request between each of the multiple sources;
perform a similarity analysis between any instances that are not an exact match;
determine, based on the similarity analysis, whether a similarity of any instances that are not the exact match satisfies a similarity threshold;
when the similarity of any instances that are not the exact match does not satisfy a similarity threshold, refrain from outputting, to the user, a response to the request; and
when the similarity of any instances that are not the exact match satisfies the similarity threshold, output, to the user, a response to the request.

11. The system of claim 10, wherein the instructions further cause the one or more processors to:
input, into a third AI system, the data that is relevant to the request and that is customized to the first type of user to obtain the response to the request that conforms to a particular style,
wherein the third AI system is trained to conform responses to the particular style, the particular style comprising one or more of syntax, structure, or presentation.

12. The system of claim 10, wherein the instructions further cause the one or more processors to perform a search relating to the request within a cache of stored data previously retrieved from one or more databases, and wherein the request and the prompt are input into the second AI system based on a failure of the search to return relevant results.

13. The system of claim 10, wherein the instructions further cause the one or more processors to:
determine that the data that is relevant to the request is not an exact match between each of the multiple sources; and
based on the determination that the data that is relevant to the request is not the exact match between each of the multiple sources, refrain from outputting, to the user, the response to the request.

14. The system of claim 10, wherein the instructions further cause the one or more processors to:
determine a total number of sources storing the data that is relevant to the request;
perform a comparison between a number of the multiple sources and the total number of sources to determine a completeness score of an output generated by the second AI system, the output comprising the data that is relevant to the request;
determine, based on the comparison, that the completeness score does not satisfy a completeness threshold; and
based on the determination that the completeness score does not satisfy the completeness threshold, refrain from outputting, to the user, the response to the request.

* * * * *